(12) United States Patent
Wang et al.

(10) Patent No.: US 11,126,026 B2
(45) Date of Patent: Sep. 21, 2021

(54) DISPLAY PANEL HAVING BLACK MATRIX COMPRISING LINEAR POLARIZER LAYER AND FABRICATING METHOD THEREOF

(71) Applicant: BOE Technology Group Co., Ltd., Beijing (CN)

(72) Inventors: Yingtao Wang, Beijing (CN); Jikai Yao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 557 days.

(21) Appl. No.: 16/079,736

(22) PCT Filed: Jan. 16, 2018

(86) PCT No.: PCT/CN2018/072819
§ 371 (c)(1),
(2) Date: Aug. 24, 2018

(87) PCT Pub. No.: WO2019/041729
PCT Pub. Date: Mar. 7, 2019

(65) Prior Publication Data
US 2021/0191187 A1    Jun. 24, 2021

(30) Foreign Application Priority Data

Aug. 31, 2017   (CN) .......................... 201710772211.0

(51) Int. Cl.
*G02F 1/1335* (2006.01)
*G02F 1/1333* (2006.01)

(52) U.S. Cl.
CPC .. *G02F 1/133512* (2013.01); *G02F 1/133305* (2013.01); *G02F 1/133548* (2021.01)

(58) Field of Classification Search
None
See application file for complete search history.

(56) References Cited

U.S. PATENT DOCUMENTS

| 5,929,960 A | 7/1999 | West et al. |
| 2005/0095514 A1* | 5/2005 | Lee .................. G03F 7/0007 430/7 |

(Continued)

FOREIGN PATENT DOCUMENTS

| CN | 105204216 A | 12/2015 | |
| CN | 105807479 A * | 7/2016 | ............... G02B 1/08 |

(Continued)

OTHER PUBLICATIONS

English translation of CN-105807479-A, Title: Display panel as well as production method and display device thereof, Author: Jiang Liangliang; Date of publication: Jul. 27, 2016 (Year: 2016).*

(Continued)

*Primary Examiner* — Shan Liu
(74) *Attorney, Agent, or Firm* — Intellectual Valley Law, P.C.

(57) ABSTRACT

The present application discloses a display panel having an inter-subpixel region and a subpixel region. The display panel includes a first display substrate and a second display substrate facing each other; and a spacer layer having a plurality of spacers for maintaining a spacing between the first display substrate and the second display substrate. The first display substrate includes a first base substrate; and a black matrix in the inter-subpixel region and on the first base substrate, and including a linear polarizer layer in a first region of the inter-subpixel region and outside the subpixel region. An orthographic projection of the linear polarizer layer on the first base substrate substantially covers projections of the plurality of spacers on the first base substrate.

14 Claims, 7 Drawing Sheets

(56) References Cited

U.S. PATENT DOCUMENTS

| | | | | |
|---|---|---|---|---|
| 2010/0079704 A1* | 4/2010 | Cho | ................ | G02F 1/133617 |
| | | | | 349/71 |
| 2010/0238385 A1* | 9/2010 | Zhang | ................ | H04N 9/3105 |
| | | | | 349/96 |
| 2015/0362782 A1* | 12/2015 | Miao | ................ | B32B 3/30 |
| | | | | 349/156 |
| 2016/0116798 A1* | 4/2016 | Nam | ................ | G02F 1/133528 |
| | | | | 349/42 |
| 2016/0154259 A1* | 6/2016 | Kim | ................ | G02F 1/134363 |
| | | | | 257/40 |
| 2016/0238882 A1* | 8/2016 | Yang | ................ | G02F 1/133528 |
| 2017/0261778 A1 | 9/2017 | Lan et al. | | |
| 2018/0188600 A1* | 7/2018 | Jiang | ................ | G03F 7/0045 |
| 2018/0239199 A1* | 8/2018 | Osato | ................ | G02F 1/133514 |

FOREIGN PATENT DOCUMENTS

| | | |
|---|---|---|
| CN | 105807479 A | 7/2016 |
| CN | 106896559 A | 6/2017 |

OTHER PUBLICATIONS

International Search Report & Written Opinion dated June 8, 2018 regarding PCT/CN2018/072819.

* cited by examiner

DISPLAY PANEL HAVING BLACK MATRIX COMPRISING LINEAR POLARIZER LAYER AND FABRICATING METHOD THEREOF

CROSS-REFERENCE TO RELATED APPLICATION

This application is a national stage application under 35 U.S.C. § 371 of International Application No. PCT/CN2018/072819, filed Jan. 16, 2018, which claims priority to Chinese Patent Application No. 201710772211.0, filed Aug. 31, 2017, the contents of which are incorporated by reference in the entirety.

TECHNICAL FIELD

The present invention relates to display technology, more particularly, to a display substrate, a display panel, a display apparatus, and a method of fabricating a display panel.

BACKGROUND

Typically, a liquid crystal display panel includes an array substrate and a color filter substrate assembled together. The liquid crystal display panel further includes a liquid crystal layer between the array substrate and the color filter substrate, and a spacer layer for maintaining a spacing between the array substrate and the color filter substrate.

SUMMARY

In one aspect, the present invention provides a display panel having an inter-subpixel region and a subpixel region, comprising a first display substrate and a second display substrate facing each other; and a spacer layer comprising a plurality of spacers for maintaining a spacing between the first display substrate and the second display substrate; wherein the first display substrate comprises a first base substrate; and a black matrix in the inter-subpixel region and on the first base substrate, and comprising a linear polarizer layer in a first region of the inter-subpixel region and outside the subpixel region; wherein an orthographic projection of the linear polarizer layer on the first base substrate substantially covers projections of the plurality of spacers on the first base substrate.

Optionally, the linear polarizer layer extends substantially throughout the inter-subpixel region; and the black matrix consists essentially of the linear polarizer layer in the inter-subpixel region.

Optionally, the black matrix further comprises a black material layer in a second region of the inter-subpixel region and outside the subpixel region, the second region outside the first region; and orthographic projections of the black material layer and the linear polarizer layer on the first base substrate are substantially non-overlapping.

Optionally, the display panel further comprises a first polarizer on the first base substrate and extending substantially throughout the first base substrate; wherein a light transmission axis of the linear polarizer layer and a light transmission axis of the first polarizer are substantially perpendicular to each other.

Optionally, the black matrix is on a side of the first base substrate proximal to the second display substrate; and the first polarizer is on a side of the first base substrate distal to the second display substrate.

Optionally, the linear polarizer layer is a wire grid polarizer layer comprising a plurality of substantially parallel wires spaced apart from each other; and each of the plurality of substantially parallel wires extends along a direction substantially parallel to the light transmission axis of the first polarizer.

Optionally, each of the plurality of substantially parallel wires has a width in a range of approximately 30 nm to approximately 100 nm and a thickness in a range of approximately 50 nm to approximately 200 nm; and adjacent parallel wires of the plurality of substantially parallel wires are spaced apart by an interval in a range of approximately 30 nm to approximately 100 nm.

Optionally, the plurality of substantially parallel wires area plurality of substantially parallel metal wires.

Optionally, the second display substrate comprises a second base substrate and a second polarizer on the second base substrate; and a light transmission axis of the second polarizer and the light transmission axis of the first polarizer are substantially perpendicular to each other.

Optionally, the plurality of spacers are a plurality of polymer wall spacers.

Optionally, the display panel is a flexible display panel.

In another aspect, the present invention provides a display apparatus comprising the display panel described herein or fabricated by a method described herein.

In another aspect, the present invention provides a display substrate having an inter-subpixel region and a subpixel region, comprising a base substrate; and a black matrix in the inter-subpixel region and on the base substrate, and comprising a linear polarizer layer in a first region of the inter-subpixel region and outside the subpixel region.

Optionally, the linear polarizer layer extends substantially throughout the inter-subpixel region; and the black matrix consists essentially of the linear polarizer layer in the inter-subpixel region.

Optionally, the black matrix further comprises a black material layer in a second region of the inter-subpixel region and outside the subpixel region, the second region outside the first region; and orthographic projections of the black material layer and the linear polarizer layer on the base substrate are substantially non-overlapping.

Optionally, the linear polarizer layer is a wire grid polarizer layer comprising a plurality of substantially parallel wires spaced apart from each other.

Optionally, each of the plurality of substantially parallel wires has a width in a range of approximately 30 nm to approximately 100 nm and a thickness in a range of approximately 50 nm to approximately 200 nm; and adjacent parallel wires of the plurality of substantially parallel wires are spaced apart by an interval in a range of approximately 30 nm to approximately 100 nm.

Optionally, the plurality of substantially parallel wires area plurality of substantially parallel metal wires.

In another aspect, the present invention provides a method of fabricating a display panel, comprising providing a first display substrate comprising a first base substrate and a black matrix on the first base substrate, the black matrix comprising a linear polarizer layer in a first region of an inter-subpixel region of the display panel and outside a subpixel region of the display panel; providing a second display substrate; assembling the first display substrate and the second display substrate into a cell; dispensing a solution comprising photoreactive monomers into the cell; exposing the solution to irradiation along a direction from the first display substrate to the second display substrate using a mask plate to polymerize a portion of the solution thereby forming a spacer layer comprising a plurality of spacers; and subsequent to exposing the solution, forming a first polarizer on the first base substrate and extending substantially throughout the first base substrate; wherein a light transmission axis of the linear polarizer layer and a light transmission axis of the first polarizer are formed to be substantially perpendicular to each other.

Optionally, the photoreactive monomers are liquid crystalline photoreactive monomers.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1A:
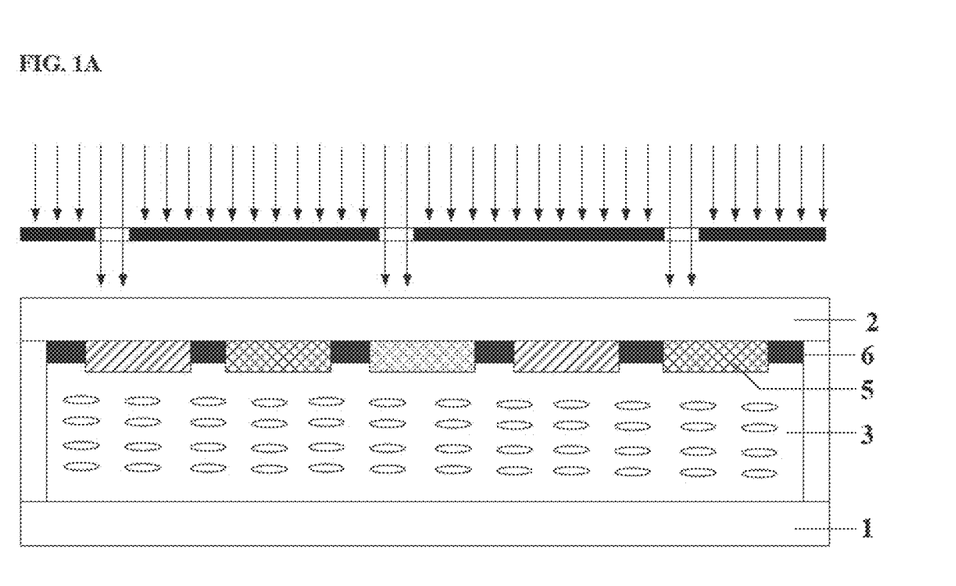
FIGS. 1A and 1B illustrate a process of fabricating a display panel having a polymer wall spacer in some embodiments according to the present disclosure.
Figure 1B:
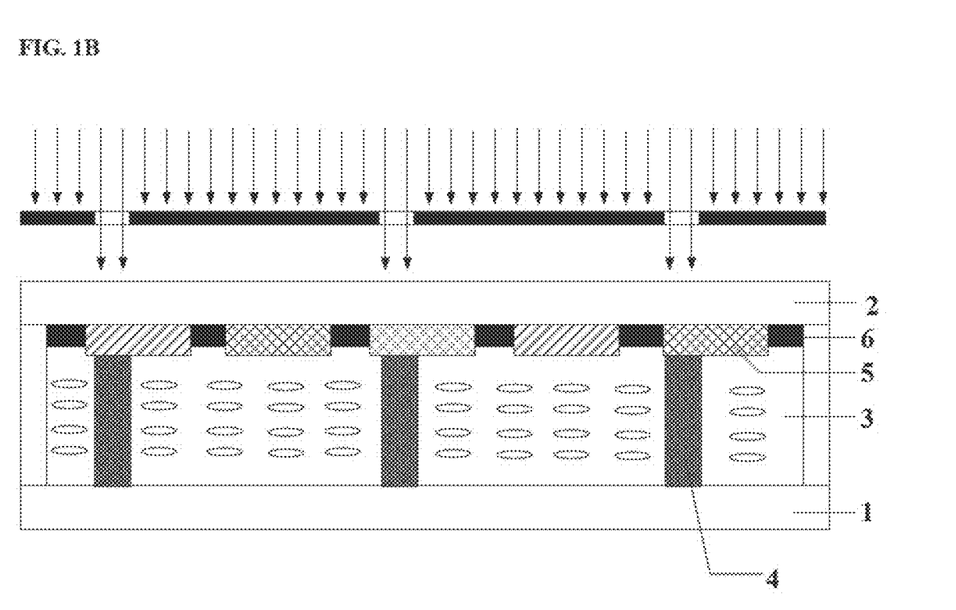

In making a flexible liquid crystal display panel, a flexible spacer layer is required. In some embodiments, a polymer wall spacer is used as the flexible spacer layer between the array substrate and the color filter substrate. FIGS. 1A and 1B illustrate a process of fabricating a display panel having a polymer wall spacer in some embodiments according to the present disclosure. Referring to FIG. 1A, an array substrate 1 and a color filter substrate 2 are assembled into a cell. A solution 3 including photoreactive monomers is dispensed in the cell. The solution 3 is irradiated by UV light to polymerize the photoreactive monomers. Referring to FIG. 1B, the photoreactive monomers in the region exposed to the UV light polymerize, forming a polymer wall spacer 4.

The color filter substrate 2 includes a color filter 5 and a black matrix 6 between adjacent color filter blocks of the color filter 5. Because the black matrix 6 is light blocking, the polymer wall spacer 4 is formed in a region outside the black matrix 6, e.g., in a region corresponding to the color filter 5, compromising aperture ratio of the display panel.

Accordingly, the present disclosure provides, inter alia, a display substrate, a display panel, a display apparatus, and a method of fabricating a display panel that substantially obviate one or more of the problems due to limitations and disadvantages of the related art. In one aspect, the present disclosure provides a display panel having an inter-subpixel region and a subpixel region. The display panel includes a first display substrate and a second display substrate facing each other; and a spacer layer having a plurality of spacers for maintaining a spacing between the first display substrate and the second display substrate. Optionally, the first display substrate includes a first base substrate and a black matrix in the inter-subpixel region and on the first base substrate. Optionally, the black matrix includes a linear polarizer layer in a first region of the inter-subpixel region and outside the subpixel region. Optionally, an orthographic projection of the linear polarizer layer on the first base substrate substantially covers projections of the plurality of spacers on the first base substrate. Optionally, the orthographic projection of the linear polarizer layer on the first base substrate substantially overlaps with projections of the plurality of spacers on the first base substrate. Optionally, the plurality of spacers are a plurality of polymer wall spacers, e.g., formed by polymerizing liquid crystal monomers.

As used herein, a subpixel region refers to a light emission region of a subpixel or subpixel area, such as a region corresponding to a pixel electrode in a liquid crystal display and a region corresponding to a light emissive layer in an organic light emitting diode display panel. Optionally, a pixel or a pixel area may include a number of separate light emission regions corresponding to a number of subpixels in the pixel or a number of subpixel areas in the pixel area. Optionally, the subpixel region is a light emission region of a red color subpixel or a red color subpixel area. Optionally, the subpixel region is a light emission region of a green color subpixel or a green color subpixel area. Optionally, the subpixel region is a light emission region of a blue color subpixel or a blue color subpixel area. Optionally, the subpixel region is a light emission region of a white color subpixel or a white color subpixel area. As used herein, an inter-subpixel region refers to a region between adjacent subpixel regions, such as a region corresponding to a black matrix in a liquid crystal display and a region corresponding a pixel definition layer in an organic light emitting diode display panel. Optionally, the inter-subpixel region is a region between adjacent subpixel regions in a same pixel or pixel area. Optionally, the inter-subpixel region is a region between two adjacent subpixel regions from two adjacent pixels or pixel areas. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

Figure 2:
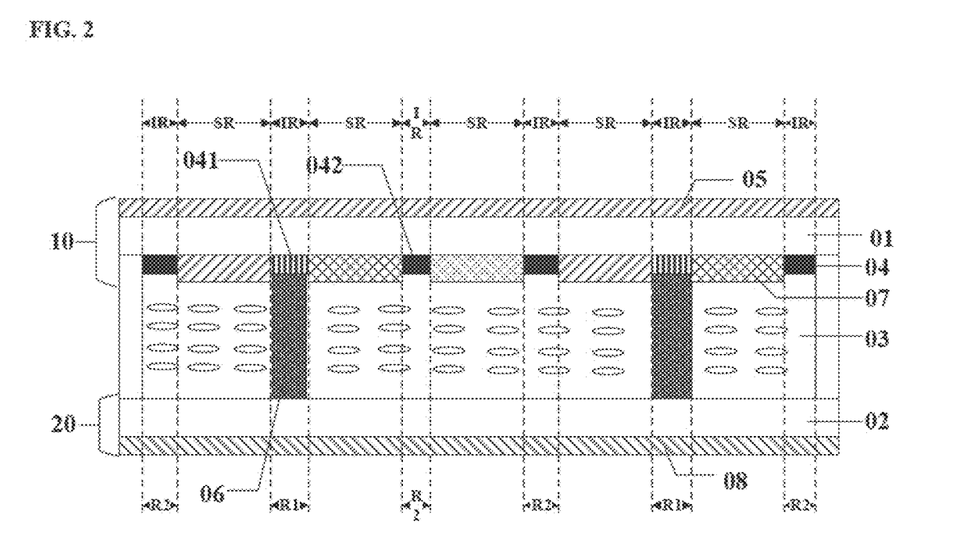
FIG. 2 is a schematic diagram illustrating the structure of a display panel in some embodiments according to the present disclosure.

FIG. 2 is a schematic diagram illustrating the structure of a display panel in some embodiments according to the present disclosure. Referring to FIG. 2, the display panel includes an inter-subpixel region IR and a subpixel region SR. The display panel includes a first display substrate 10 (e.g., a color filter substrate) and a second display substrate 20 (e.g., an array substrate) facing each other, and a spacer layer 06 having a plurality of spacers for maintaining a spacing between the first display substrate 10 and the second display substrate 20. The first display substrate 10 includes a first base substrate 01 and a black matrix 04 in the inter-subpixel region IR and on the first base substrate 01. In some embodiments, the black matrix 04 includes a linear polarizer layer 041 in a first region R1 of the inter-subpixel region IR and outside the subpixel region SR. Optionally, an orthographic projection of the linear polarizer layer 041 on the first base substrate 01 substantially covers projections of the plurality of spacers of the spacer layer 06 on the first base substrate 01. Optionally, the orthographic projection of the linear polarizer layer 041 on the first base substrate 01 substantially overlaps with the projections of the plurality of spacers of the spacer layer 06 on the first base substrate 01.

The display panel depicted in FIG. 2 is a liquid crystal display panel having a liquid crystal layer 03 between the first display substrate 10 and the second display substrate 20. The display panel further includes a first polarizer 05 on the first base substrate 01 and extending substantially throughout the first base substrate 01. Optionally, and as shown in FIG. 2, the black matrix 04 and the first polarizer 05 are disposed on two opposite sides of the first base substrate 01. In one example, the black matrix 04 is on a side of the first base substrate 01 proximal to the liquid crystal layer 03, and the first polarizer 05 is on a side of the first base substrate 01 distal to the liquid crystal layer 03. A light transmission axis of the linear polarizer layer 041 and a light transmission axis of the first polarizer 05 are substantially perpendicular to each other.

In the present display panel, the black matrix 04 includes a linear polarizer layer 041 in at least a region (e.g., the first region R1) of the inter-subpixel region IR. Because the linear polarizer layer 041 itself is light transmissive, e.g., allowing UV light to transmit through, a polymer wall spacer can be formed in a region corresponding to the linear polarizer layer 041 or a portion thereof, e.g., the orthographic projection of the linear polarizer layer 041 on the first base substrate 01 substantially covers the projections of the plurality of spacers of the spacer layer 06 on the first base substrate 01. Accordingly, the polymer wall spacer can be formed outside the subpixel region of the display panel without reducing aperture ratio of the display panel. Although the linear polarizer layer 041 itself is light transmissive, a structure having a combination of the linear polarizer layer 041 and a first polarizer 05 stacked on top of the linear polarizer layer 041 is light blocking because their light transmission axes are made to be substantially perpendicular to each other. Thus, the linear polarizer layer 041 effectively acts as a black matrix for blocking light when the display panel is assembled.

Referring to FIG. 2, the black matrix 04 in some embodiments further includes a black material layer 042 in a second region R2 of the inter-subpixel region IR and outside the subpixel region SR. The second region R2 is outside the first region R1. e.g., an orthographic projection of the second region R2 on the first base substrate 01 is substantially non-overlapping with an orthographic projection of the first region R1. An orthographic projection of the black material layer 042 is substantially non-overlapping with an orthographic projection of the linear polarizer layer 041 on the first base substrate 01.

Figure 3:
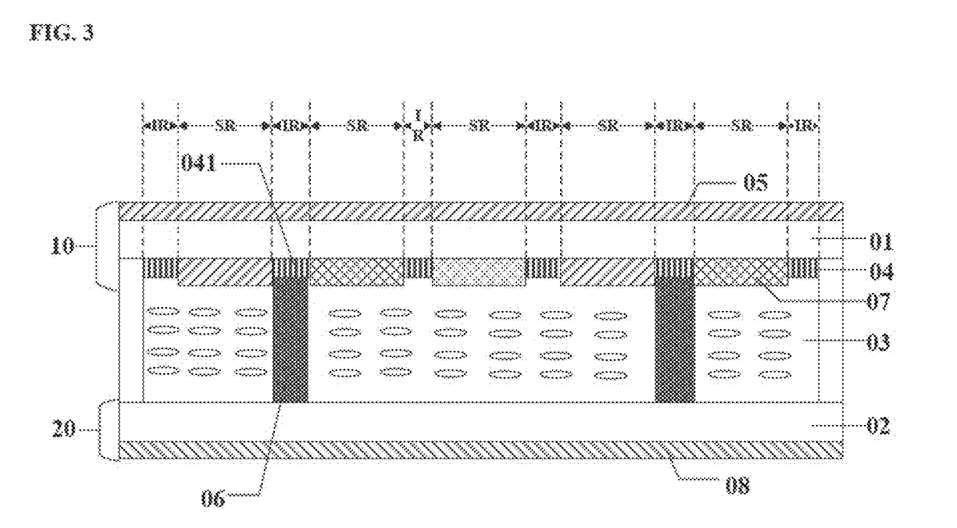
FIG. 3 is a schematic diagram illustrating the structure of a display panel in some embodiments according to the present disclosure.

FIG. 3 is a schematic diagram illustrating the structure of a display panel in some embodiments according to the present disclosure. Referring to FIG. 3, in some embodiments, the black matrix 04 consists essentially of the linear polarizer layer 041 in the inter-subpixel region IR, e.g., the linear polarizer layer 041 extends substantially throughout the inter-subpixel region IR. Optionally, the inter-subpixel region IR consists essentially of the first region R1. Optionally, the entire black matrix 04 is made of the linear polarizer layer 041, e.g., without any black material.

In some embodiments, the display panel in some embodiments further includes a color filter 07 in the subpixel region SR. Referring to FIG. 2 and FIG. 3, the color filter 07 in some embodiments is in the first display substrate 10. Optionally, the color filter 07 is on a side of the first base substrate 01 proximal to the liquid crystal layer 03 and distal to the first polarizer 05. Optionally, the color filter 07 includes a plurality of color filter blocks, e.g., a plurality of red color filter blocks, a plurality of green color filter blocks, and a plurality of blue color filter blocks. Optionally, the black matrix 04 is in a region between adjacent color filter blocks of the plurality of color filter blocks. Optionally, a projection of the color filter 07 on the first base substrate 01 is substantially non-overlapping with a projection of the black matrix 04 (including the linear polarizer layer 041 and the black material layer 042) on the first base substrate 01. Optionally, the projection of the color filter 07 on the first base substrate 01 partially overlaps with the projection of the black matrix 04 (including the linear polarizer layer 041 and the black material layer 042) on the first base substrate 01.

In some embodiments, and referring to FIG. 2 and FIG. 3, the second display substrate 20 includes a second base substrate 02 and a second polarizer 08 on the second base substrate 02. Optionally, a light transmission axis of the second polarizer 08 and the light transmission axis of the first polarizer 05 are substantially perpendicular to each other.

In some embodiments, the color filter 07 is disposed in the second display substrate 20. Optionally, the color filter 07 is on a side of the second base substrate 02 proximal to the liquid crystal layer 03, e.g., distal to a second polarizer 08.

Figure 4:
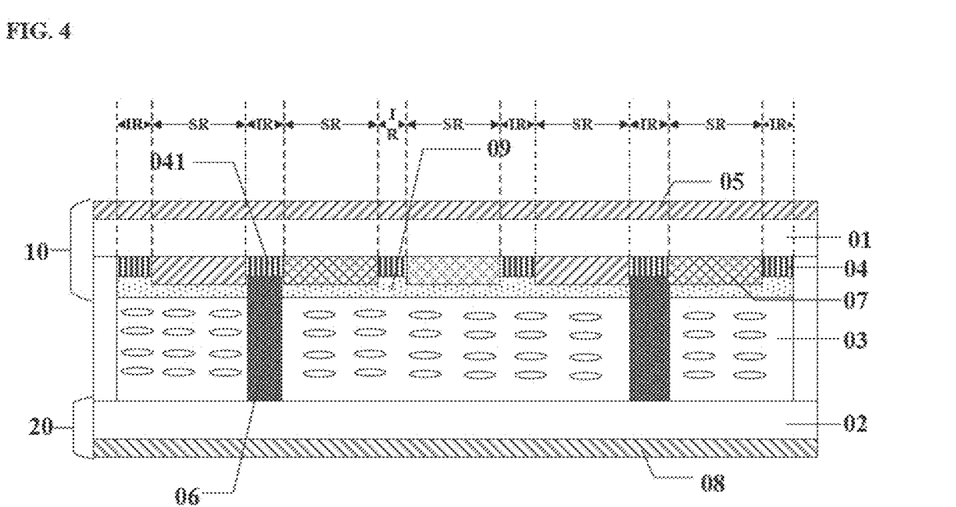
FIG. 4 is a schematic diagram illustrating the structure of a display panel in some embodiments according to the present disclosure.

FIG. 4 is a schematic diagram illustrating the structure of a display panel in some embodiments according to the present disclosure. Referring to FIG. 4, the first display substrate 10 in some embodiments further includes a protection layer 09. Optionally, the protection layer 09 is on a side of the black matrix 04 and the color filter 07 proximal to the liquid crystal layer 03 and distal to the first polarizer 05. Optionally, the protection layer 09 planarizes the surface of the first display substrate 10.

Various appropriate linear polarizer may be used for making the linear polarizer layer 041. Examples of appropriate linear polarizers include various appropriate anisotropic absorption polarizers such as a dichroic polarizer. Specific examples of appropriate linear polarizers include a wire grid polarizer (e.g., a metal wire grid polarizer), a dichroic organic dye polarizer, an iodine polyvinyl alcohol polarizer, and so on.

Figure 5:
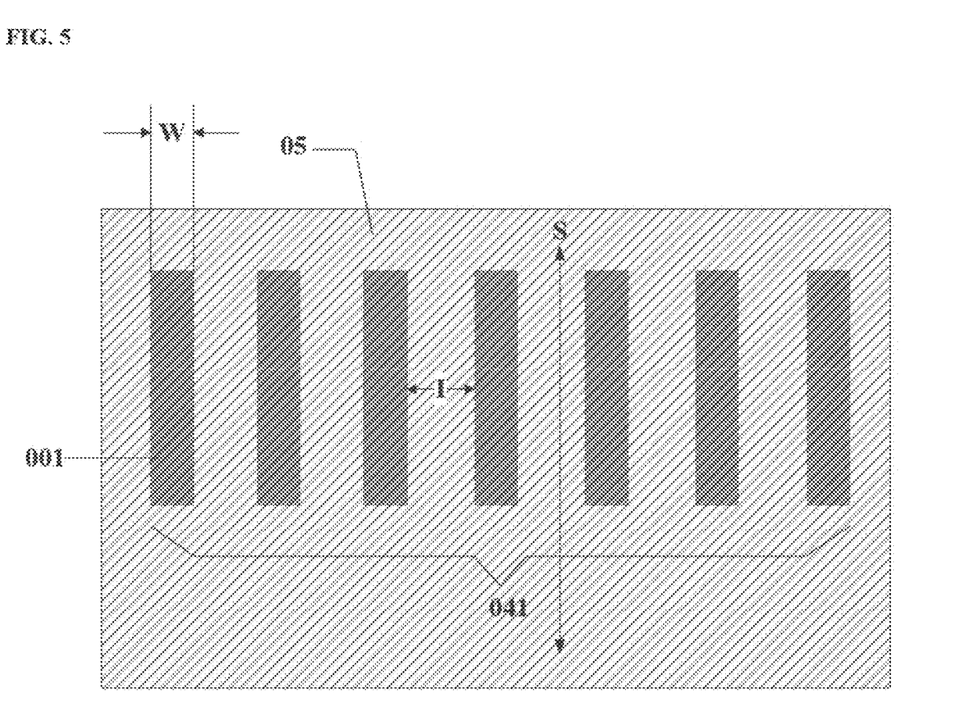
FIG. 5 is a schematic diagram illustrating a wire grid polarizer and a first polarizer in a display panel in some embodiments according to the present disclosure.

FIG. 5 is a schematic diagram illustrating a wire grid polarizer and a first polarizer in a display panel in some embodiments according to the present disclosure. Referring to FIG. 5, the linear polarizer layer 041 in some embodiments is a wire grid polarizer including a plurality of substantially parallel wires 001 spaced apart from each other. The light transmission axis of the linear polarizer layer 041 (the wire grid polarizer) is substantially perpendicular to the light transmission axis S of the first polarizer 05. Accordingly, each of the plurality of substantially parallel wires 001 extends along a direction substantially parallel to the light transmission axis S of the first polarizer 05. Optionally, the plurality of substantially parallel wires 001 are a plurality of substantially parallel metal wires.

Optionally, each of the plurality of substantially parallel wires has a width W in a range of approximately 30 nm to approximately 100 nm, e.g., approximately 30 nm to approximately 50 nm, approximately 50 nm to approximately 75 nm, and approximately 75 nm to approximately 100 nm.

Optionally, each of the plurality of substantially parallel wires has a thickness in a range of approximately 50 nm to approximately 200 nm, e.g., approximately 50 nm to approximately 100 nm, approximately 100 nm to approximately 150 nm, and approximately 150 nm to approximately 200 nm.

Optionally, adjacent parallel wires of the plurality of substantially parallel wires are spaced apart by an interval I in a range of approximately 30 nm to approximately 100 nm, e.g., approximately 30 nm to approximately 100 nm, e.g., approximately 30 nm to approximately 50 nm, approximately 50 nm to approximately 75 nm, and approximately 75 nm to approximately 100 nm.

Various appropriate spacer layers may be used in the present display panel. Optionally, the spacer layer 06 is a flexible spacer layer. Optionally, the spacer layer 06 includes a plurality of polymer wall spacers. Optionally, the spacer layer 06 includes a liquid crystal polymer. Optionally, the spacer layer 06 includes a polymer formed by polymerizing photoreactive monomers. Optionally, the photoreactive monomers are liquid crystalline photoreactive monomers.

In some embodiments, the display panel is a flexible, rollable, or bendable display panel. Optionally, the first display substrate 10 is a flexible, rollable, or bendable display substrate. Optionally, the second display substrate 20 is a flexible, rollable, or bendable display substrate. Optionally, the display panel is a liquid crystal display panel.

Figure 6:
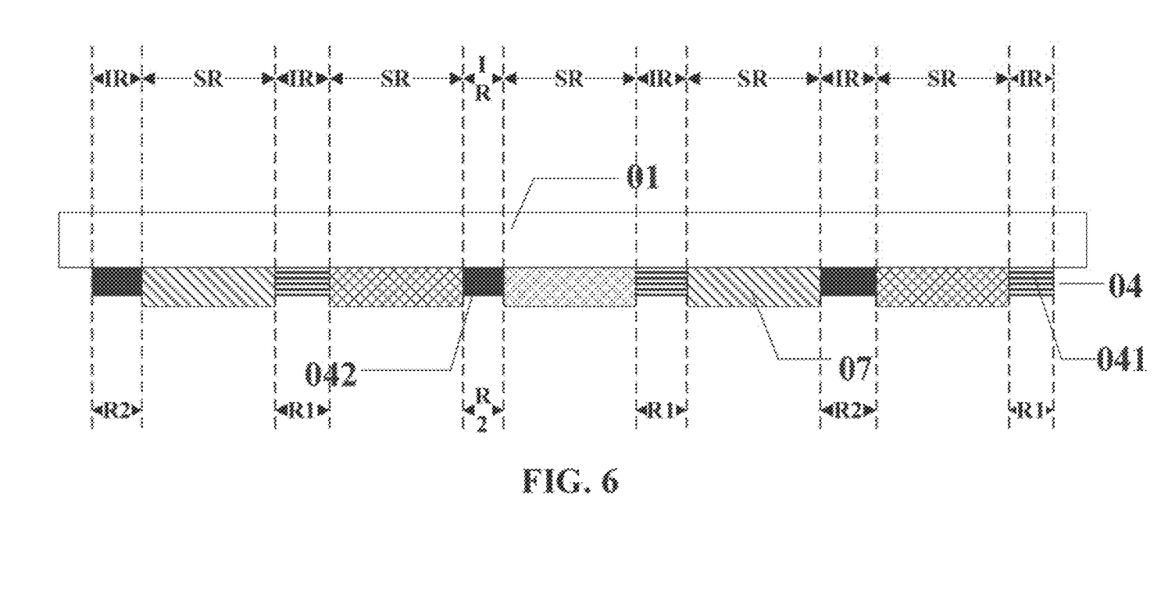
FIG. 6 is a schematic diagram illustrating the structure of a display substrate in some embodiments according to the present disclosure.

In another aspect, the present disclosure provides a display substrate. FIG. 6 is a schematic diagram illustrating the structure of a display substrate in some embodiments according to the present disclosure. Referring to FIG. 6, the display substrate has an inter-subpixel region IR and a subpixel region SR. In some embodiments, the display substrate includes a base substrate 01 and a black matrix 04 in the inter-subpixel region IR and on the base substrate 01. The black matrix 04 includes a linear polarizer layer 041 in a first region R1 of the inter-subpixel region IR and outside the subpixel region SR.

Optionally, the display substrate is an array substrate. Optionally, the display substrate is a counter substrate such as a color filter substrate or an encapsulating substrate.

Optionally, and referring to FIG. 6, the display substrate further includes a color filter 07 on the base substrate 01. Optionally, the color filter 07 includes a plurality of color filter blocks, e.g., a plurality of red color filter blocks, a plurality of green color filter blocks, and a plurality of blue color filter blocks. Optionally, the black matrix 04 is in a region between adjacent color filter blocks of the plurality of color filter blocks. Optionally, a projection of the color filter 07 on the first base substrate 01 is substantially non-overlapping with a projection of the black matrix 04 on the first base substrate 01. Optionally, the projection of the color filter 07 on the first base substrate 01 partially overlaps with the projection of the black matrix 04 on the first base substrate 01.

In some embodiments, the black matrix 04 further includes a black material layer 042 in a second region R2 of the inter-subpixel region IR and outside the subpixel region SR. The second region R2 is outside the first region R1, e.g., an orthographic projection of the second region R2 on the first base substrate 01 is substantially non-overlapping with an orthographic projection of the first region R1. An orthographic projection of the black material layer 042 is substantially non-overlapping with an orthographic projection of the linear polarizer layer 041 on the first base substrate 01.

In some embodiments, the black matrix 04 consists essentially of the linear polarizer layer 041 in the inter-subpixel region IR, e.g., the linear polarizer layer 041 extends substantially throughout the inter-subpixel region IR. Optionally, the inter-subpixel region IR consists essentially of the first region R1. Optionally, the entire black matrix 04 is made of the linear polarizer layer 041, e.g., without any black material.

In some embodiments, the display substrate further includes a protection layer. Optionally, the protection layer planarizes the surface of the first display substrate 10.

In some embodiments, the linear polarizer layer 041 is a wire grid polarizer (e.g., a metal wire grid polarizer). Optionally, the linear polarizer layer 041 is a wire grid polarizer including a plurality of substantially parallel wires 001 spaced apart from each other. Optionally, the plurality of substantially parallel wires 001 are a plurality of substantially parallel metal wires.

Optionally, each of the plurality of substantially parallel wires has a width W in a range of approximately 30 nm to approximately 100 nm, e.g., approximately 30 nm to approximately 50 nm, approximately 50 nm to approximately 75 nm, and approximately 75 nm to approximately 100 nm.

Optionally, each of the plurality of substantially parallel wires has a thickness in a range of approximately 50 nm to approximately 200 nm, e.g., approximately 50 nm to approximately 100 nm, approximately 100 nm to approximately 150 nm, and approximately 150 nm to approximately 200 nm.

Optionally, adjacent parallel wires of the plurality of substantially parallel wires are spaced apart by an interval I in a range of approximately 30 nm to approximately 100 nm, e.g., approximately 30 nm to approximately 100 nm. e.g., approximately 30 nm to approximately 50 nm, approximately 50 nm to approximately 75 nm, and approximately 75 nm to approximately 100 nm.

In some embodiments, the display substrate is a flexible, rollable, or bendable display substrate. Optionally, the display substrate is a substrate in a liquid crystal display panel.

Figure 7:
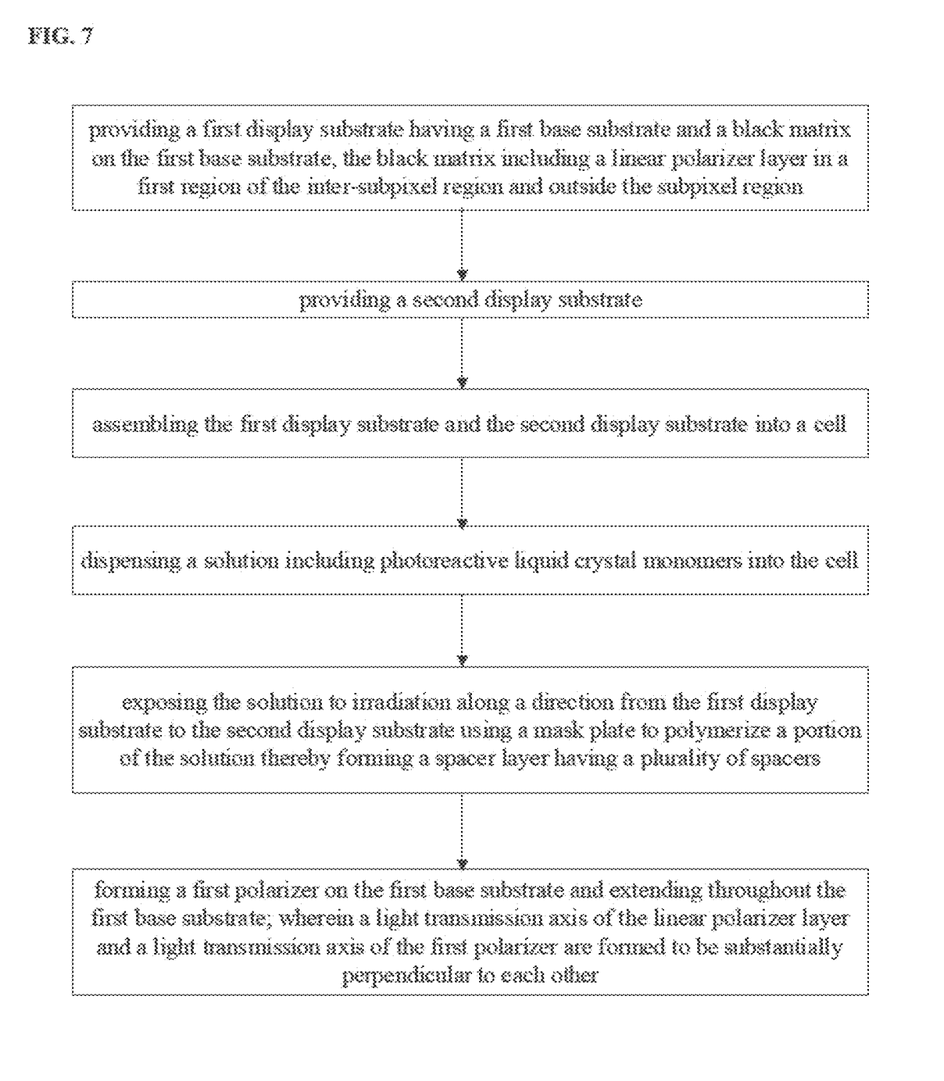
FIG. 7 is a flow chart illustrating a process of fabricating a display panel in some embodiments according to the present disclosure.

In another aspect, the present disclosure provides a method of fabricating a display panel. FIG. 7 is a flow chat illustrating a process of fabricating a display panel in some embodiments according to the present disclosure. Referring to FIG. 7, the method in some embodiments includes providing a first display substrate having a first base substrate and a black matrix on the first base substrate, the black matrix including a linear polarizer layer in a first region of the inter-subpixel region and outside the subpixel region; providing a second display substrate; assembling the first display substrate and the second display substrate into a cell; dispensing a solution including photoreactive monomers into the cell; exposing the solution to irradiation along a direction from the first display substrate to the second display substrate using a mask plate to polymerize a portion of the solution thereby forming a spacer layer having a plurality of spacers; and forming a first polarizer on the first base substrate and extending substantially throughout the first base substrate. Optionally, a light transmission axis of the linear polarizer layer and a light transmission axis of the first polarizer are formed to be substantially perpendicular to each other. Optionally, the photoreactive monomers are liquid crystalline photoreactive monomers.

Figure 8A:
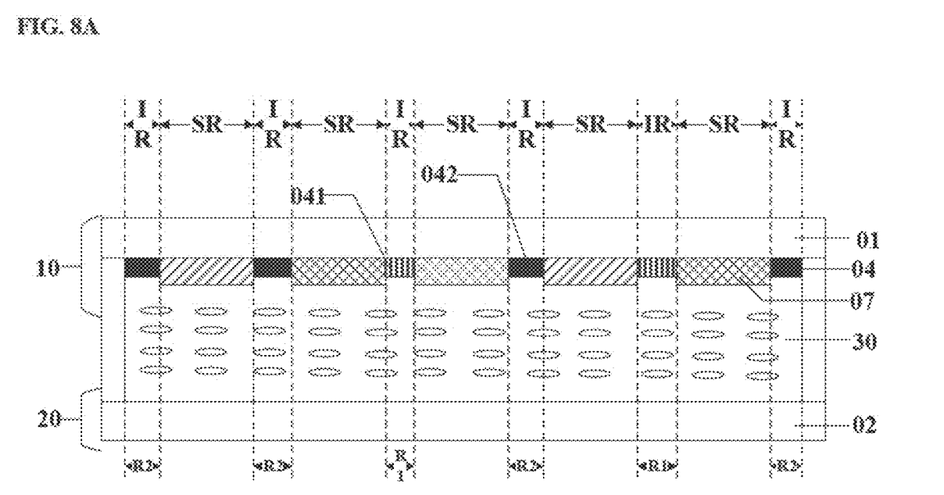
FIGS. 8A to 8D illustrate a process of fabricating a display panel in some embodiments according to the present disclosure.

FIGS. 8A to 8D illustrate a process of fabricating a display panel in some embodiments according to the present disclosure. Referring to FIG. 8A, a first display substrate 10 and a second display substrate 20 are assembled into a cell. The first display substrate 10 includes a first base substrate 01 and a black matrix 04 on the first base substrate 01. The black matrix 04 includes a linear polarizer layer 041 in a first region R1 of the inter-subpixel region IR and outside the subpixel region SR. A liquid crystal solution 30 is dispensed into the cell. Optionally, the liquid crystal solution includes photoreactive monomers (e.g., liquid crystalline photoreactive monomers).

Figure 8B:
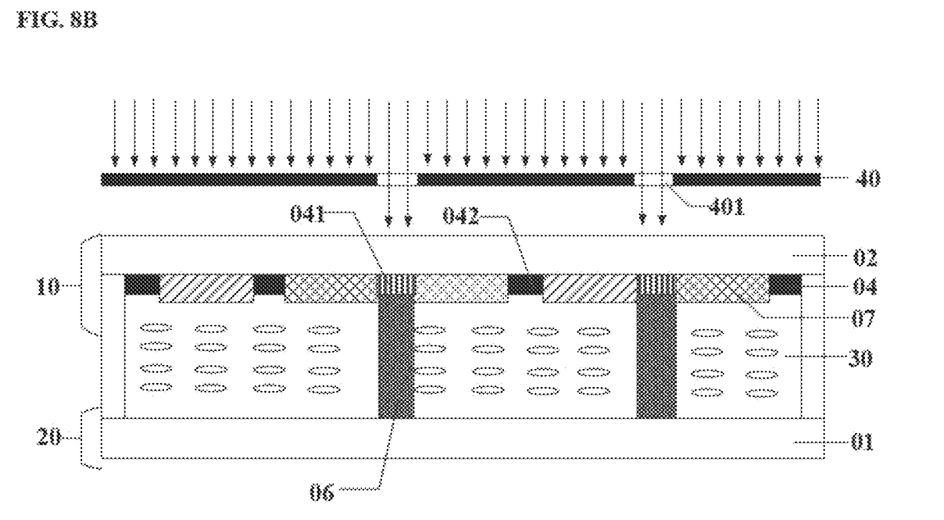

Referring to FIG. 8B, the assembled cell is exposed to irradiation (e.g., UV irradiation) along a direction substantially from the first display substrate 10 to the second display substrate 20. The exposure is performed using a mask plate 40 to polymerize a portion of the liquid crystal solution 30 thereby forming a spacer layer 06 having a plurality of spacers. Optionally, the mask plate 40 has a light transmissive region corresponding to the plurality of spacers of the spacer layer 06 to be formed in the assembled cell. Optionally, the mask plate 40 has a light transmissive region corresponding to the linear polarizer layer 041. Upon exposure to the UV irradiation, the exposed portion of the liquid crystal solution 30 polymerizes into a spacer layer 06. Optionally, the spacer layer 06 is a polymer wall spacer.

Figure 8C:
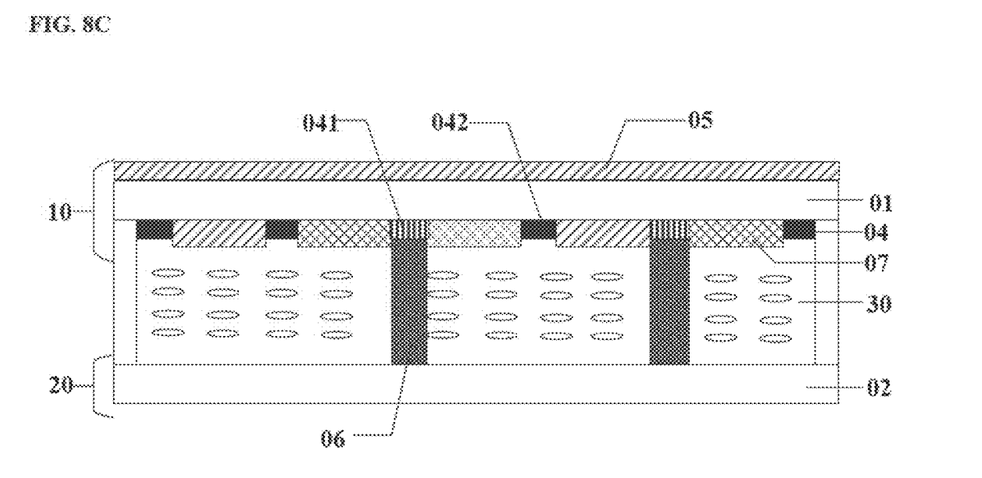
Figure 8D:
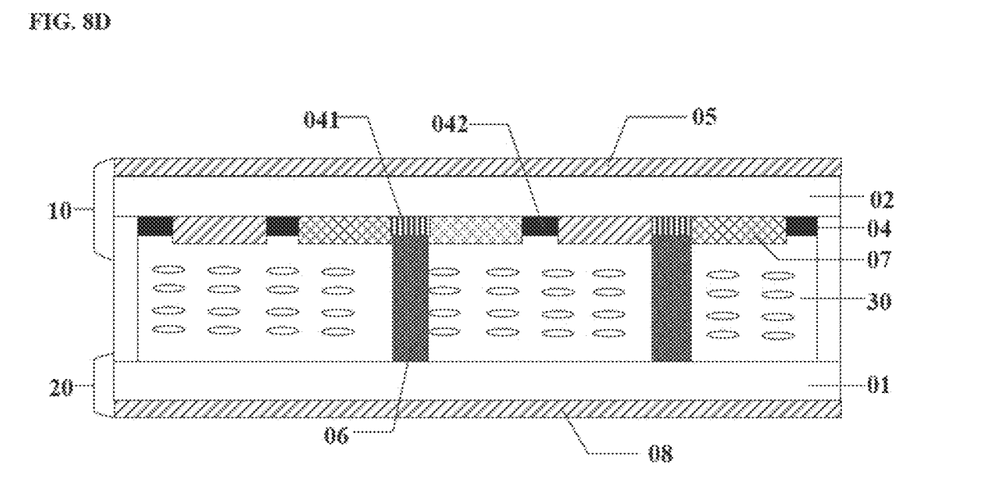

Referring to FIG. 8C, subsequent to forming the spacer layer 06, a first polarizer 05 is formed on the first base substrate 01 and extending throughout the first base substrate 01. Optionally, the first polarizer 05 is formed on a side of the first base substrate 01 distal to the black matrix 04. The first polarizer 05 is formed so that a light transmission axis of the linear polarizer layer 041 and a light transmission axis of the first polarizer 05 are substantially perpendicular to each other.

In the present method, the black matrix 04 includes a linear polarizer layer 041 in at least a region (e.g., the first region R1) of the inter-subpixel region IR. Because the linear polarizer layer 041 itself is light transmissive, e.g., allowing UV light to transmit through, a polymer wall spacer can be formed in a region corresponding to the linear polarizer layer 041 or a portion thereof, e.g., the orthographic projection of the linear polarizer layer 041 on the first base substrate 01 substantially covers the projections of the plurality of spacers of the spacer layer 06 on the first base substrate 01. Accordingly, the polymer wall spacer can be formed outside the subpixel region SR of the display panel without reducing aperture ratio of the display panel. Although the linear polarizer layer 041 itself is light transmissive, a structure having a combination of the linear polarizer layer 041 and a first polarizer 05 stacked on top of the linear polarizer layer 041 is light blocking because their light transmission axes are made to be substantially perpendicular to each other. Thus, the linear polarizer layer 041 effectively acts as a black matrix for blocking light when the display panel is assembled.

In another aspect, the present disclosure further provides a method of forming a display substrate having an inter-subpixel region and a subpixel region. In some embodiments, the method includes forming a black matrix on a base substrate and in the inter-subpixel region. The black matrix is formed to include a linear polarizer layer in a first region of the inter-subpixel region and outside the subpixel region. Optionally, the linear polarizer layer is formed to extend substantially throughout the inter-subpixel region, and the black matrix is formed to consist essentially of the linear polarizer layer. Optionally, the step of forming the black matrix further includes forming a black material layer in a second region of the inter-subpixel region and outside the subpixel region, the second region outside the first region. Optionally, the black material layer and the linear polarizer layer are formed so that orthographic projections of the black material layer and the linear polarizer layer on the base substrate are substantially non-overlapping.

In another aspect, the present disclosure provides a display apparatus having a display panel or display substrate described herein or fabricated by a method described herein. Optionally, the display substrate is an array substrate. Optionally, the display substrate is a counter substrate such as a color filter substrate or an encapsulating substrate. Optionally, the display apparatus is a liquid crystal display apparatus. Optionally, the display apparatus is a flexible, rollable, or bendable display apparatus. Optionally, the display apparatus is a flexible, rollable, or bendable liquid crystal display apparatus. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having an inter-subpixel region and a subpixel region, comprising:
   a first display substrate and a second display substrate facing each other; and
   a spacer layer comprising a plurality of spacers for maintaining a spacing between the first display substrate and the second display substrate;
   wherein the first display substrate comprises:
   a first base substrate; and
   a black matrix in the inter-subpixel region and on the first base substrate, and comprising a linear polarizer layer in a first region of the inter-subpixel region and outside the subpixel region, and a black material layer in a second region of the inter-subpixel region and outside the subpixel region, the second region outside the first region;

wherein an orthographic projection of the linear polarizer layer on the first base substrate substantially covers orthographic projections of the plurality of spacers on the first base substrate;

orthographic projections of the black material layer and the linear polarizer layer on the first base substrate are substantially non-overlapping;

the black matrix is absent of a black material in the first region and absent of a linear polarizer material in the second region; and the plurality of spacers are absent in any regions where the black matrix having the black material.

2. The display panel of claim 1, wherein the black material and the linear polarizer material are two different materials;

the black material is in and of itself light blocking; and the linear polarizer material is in and of itself at least partially light transmitting.

3. The display panel of claim 1, wherein the black material is in and of itself light blocking with respect to an ultraviolet light; and the linear polarizer material is in and of itself at least partially light transmitting with respect to the ultraviolet light.

4. The display panel of claim 1, further comprising a first polarizer on the first base substrate and extending substantially throughout the first base substrate;

wherein a light transmission axis of the linear polarizer layer and a light transmission axis of the first polarizer are substantially perpendicular to each other.

5. The display panel of claim 4, wherein the black matrix is on a side of the first base substrate proximal to the second display substrate; and the first polarizer is on a side of the first base substrate distal to the second display substrate.

6. The display panel of claim 4, wherein the linear polarizer layer is a wire grid polarizer layer comprising a plurality of substantially parallel wires spaced apart from each other; and each of the plurality of substantially parallel wires extends along a direction substantially parallel to the light transmission axis of the first polarizer.

7. The display panel of claim 6, wherein each of the plurality of substantially parallel wires has a width in a range of approximately 30 nm to approximately 100 nm and a thickness in a range of approximately 50 nm to approximately 200 nm; and adjacent parallel wires of the plurality of substantially parallel wires are spaced apart by an interval in a range of approximately 30 nm to approximately 100 nm.

8. The display panel of claim 6, wherein the plurality of substantially parallel wires are a plurality of substantially parallel metal wires.

9. The display panel of claim 4, wherein the second display substrate comprises a second base substrate and a second polarizer on the second base substrate; and a light transmission axis of the second polarizer and the light transmission axis of the first polarizer are substantially perpendicular to each other.

10. The display panel of claim 1, wherein the plurality of spacers are a plurality of polymer wall spacers.

11. The display panel of claim 1, wherein the display panel is a flexible display panel.

12. A display apparatus, comprising the display panel of claim 1.

13. A method of fabricating a display panel, comprising:

providing a first display substrate comprising a first base substrate and a black matrix on the first base substrate, the black matrix comprising a linear polarizer layer in a first region of an inter-subpixel region of the display panel and outside a subpixel region of the display panel, and a black material layer in a second region of the inter-subpixel region and outside the subpixel region, the second region outside the first region, wherein orthographic projections of the black material layer and the linear polarizer layer on the first base substrate are substantially non-overlapping, the black matrix is absent of a black material in the first region and absent of a linear polarizer material in the second region;

providing a second display substrate;

assembling the first display substrate and the second display substrate into a cell;

dispensing a solution comprising photoreactive monomers into the cell;

exposing the solution to irradiation along a direction from the first display substrate to the second display substrate using a mask plate to polymerize a portion of the solution thereby forming a spacer layer comprising a plurality of spacers; and subsequent to exposing the solution, forming a first polarizer on the first base substrate and extending substantially throughout the first base substrate;

wherein a light transmission axis of the linear polarizer layer and a light transmission axis of the first polarizer are formed to be substantially perpendicular to each other;

an orthographic projection of the linear polarizer layer on the first base substrate substantially covers orthographic projections of the plurality of spacers on the first base substrate; and the plurality of spacers are absent in any regions where the black matrix having the black material.

14. The method of claim 13, wherein the photoreactive monomers are liquid crystalline photoreactive monomers.

* * * * *